United States Patent [19]
Hamelin et al.

[11] Patent Number: 5,876,164
[45] Date of Patent: Mar. 2, 1999

[54] DEVICE FOR CARRYING CARGO

[75] Inventors: Jean-Guy Hamelin, Laval; Bernard Hamelin, Lachenaie, both of Canada

[73] Assignee: 3515 630 Canada Inc., Quebec, Canada

[21] Appl. No.: 829,694

[22] Filed: Mar. 26, 1997

[51] Int. Cl.$^6$ ................................................. B60P 7/08
[52] U.S. Cl. ................................. 410/35; 410/34; 410/43; 410/97; 410/100; 296/3; 296/182
[58] Field of Search .............................. 410/34, 35, 43, 410/46, 97, 100, 103, 104; 296/182, 36, 3, 181

[56] References Cited

U.S. PATENT DOCUMENTS

| | | | |
|---|---|---|---|
| 2,555,529 | 6/1951 | Batts | 410/35 |
| 3,075,801 | 1/1963 | Silver | 280/182 X |
| 3,451,573 | 6/1969 | Josephian | 410/35 X |
| 3,504,404 | 4/1970 | Rehnström et al. | 410/34 X |
| 4,382,736 | 5/1983 | Thomas | 410/104 |
| 5,599,058 | 2/1997 | Carter et al. | 296/182 X |

FOREIGN PATENT DOCUMENTS

| | | | |
|---|---|---|---|
| 1288111 | 2/1987 | U.S.S.R. | 410/100 |

*Primary Examiner*—Stephen T. Gordon
*Attorney, Agent, or Firm*—Fishman, Dionne, Cantor & Colburn

[57] ABSTRACT

A rectangular base mounted on wheels and coupled to a tractor. Protection walls preferably made of a steel grid are mounted at the front and rear ends and along the left longitudinal side, the opposite side remaining free from protection wall. A vertical support is disposed parallel to the protection wall mounted on the left side of the base. On the right side of the base there is a non-slip member and an attachment is provided to fix the load of the car frame to the base for transportation. Transverse members are mounted on the base which facilitate loading and unloading of car frames with a fork type loader through the right side wherein no protection wall has been provided.

16 Claims, 3 Drawing Sheets

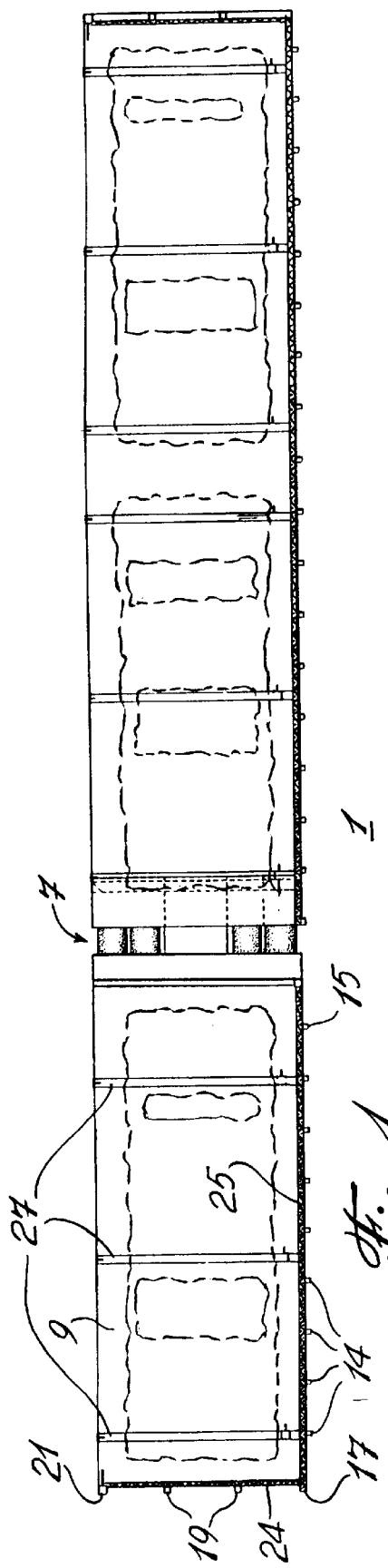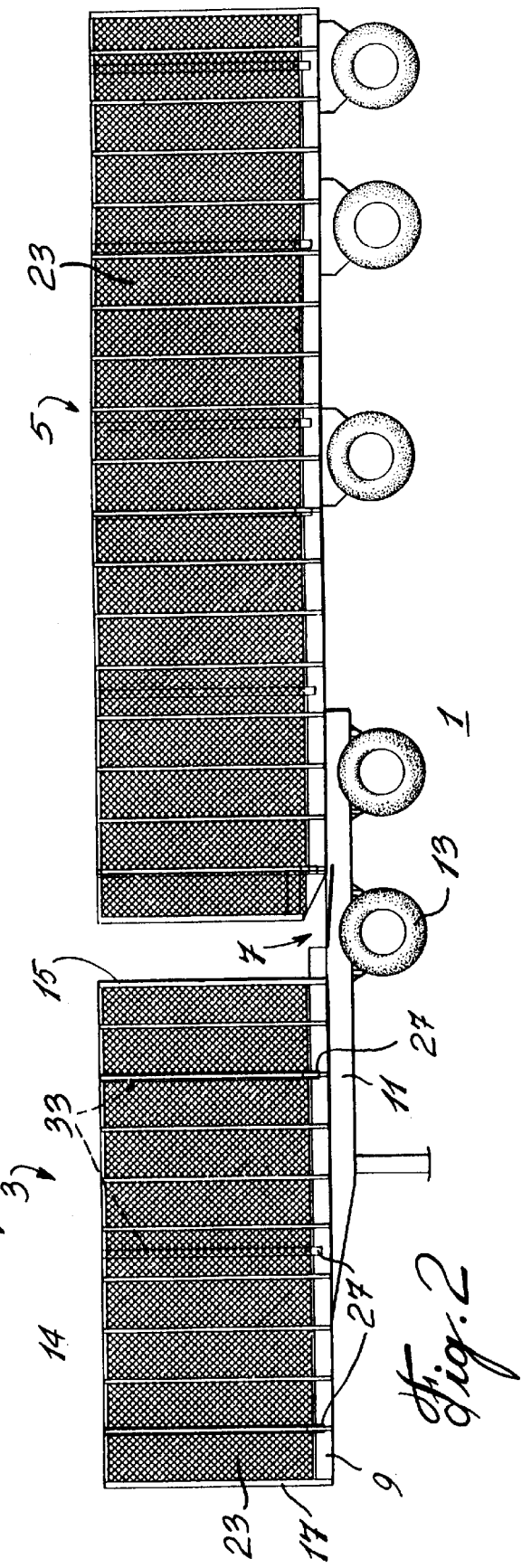

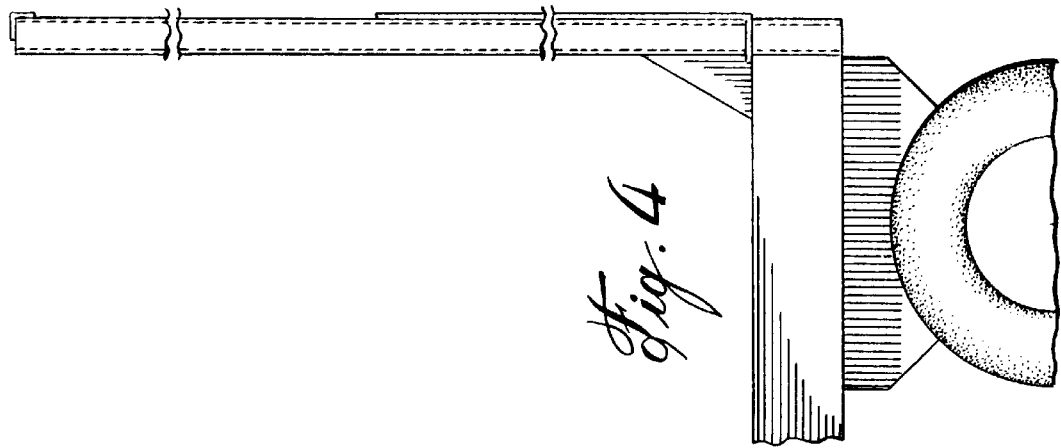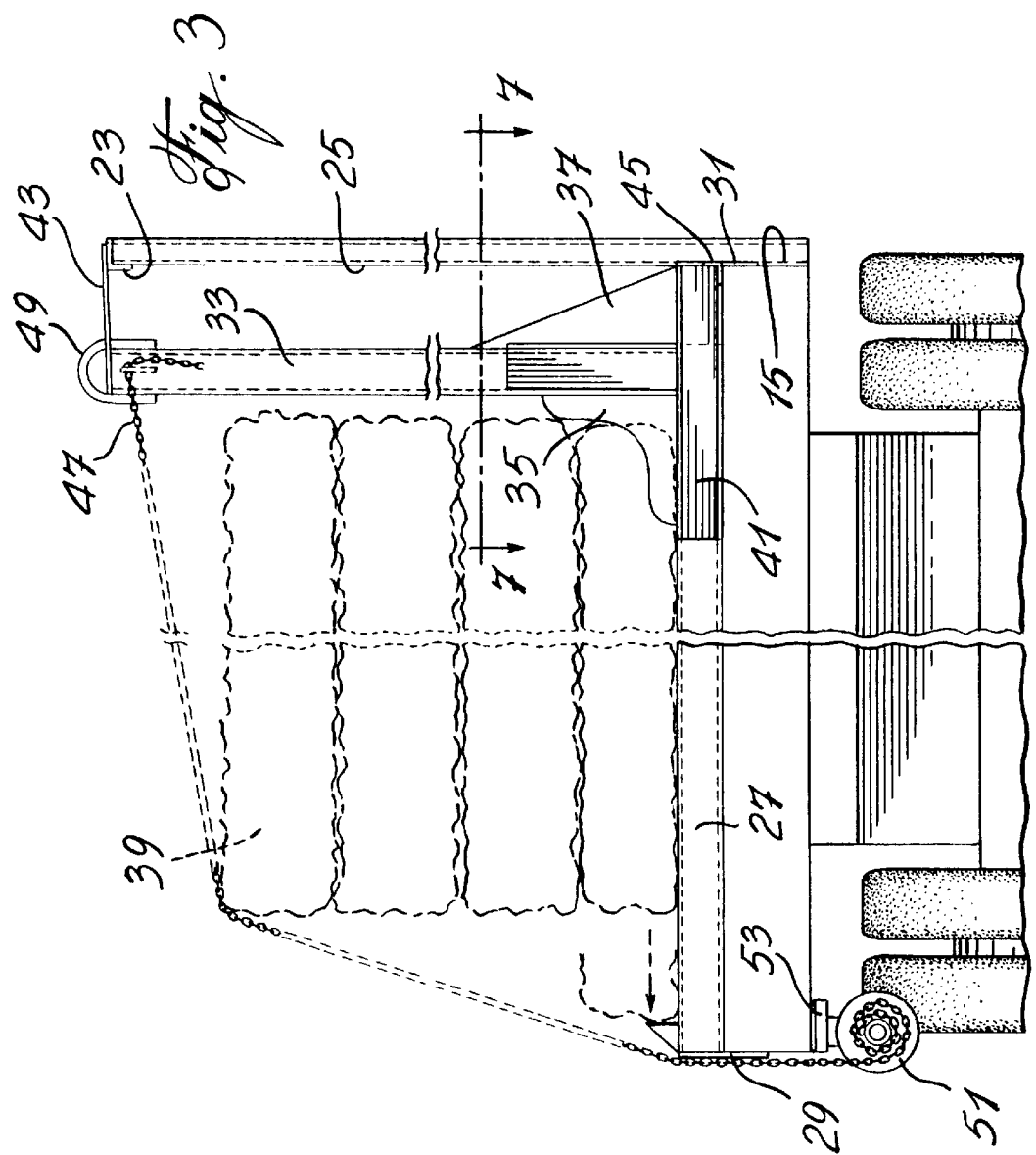

DEVICE FOR CARRYING CARGO

BACKGROUND OF INVENTION (a) Field of the Invention

The present invention relates to a device for carrying car frames or the like. More particularly, the invention is concerned with a car frame carrying equipment, such as a truck or trailer or a combination thereof which makes it possible to load car frames thereon without endangering other vehicles and their occupants when circulating on highways, by preventing loose material from escaping and flying from the car frame carrier.

(b) Description of Prior Art

For quite a while, old cars which have reached the end of their useful life and which are commonly called scrap cars, have been crushed into so-called car frames which are transported to a plant where they are recycled into various parts, the metallic portion being sold to metallurgical plants.

The transportation of these car frames is not presently subject to regulations by transportation authorities with the result that flying objects which inevitably escape from car frame carriers have often caused damage and even death to the occupants of cars. The reason is simply that today car frames are loaded onto flat beds of trucks or trailers or a combination thereof, and the stacked frames are simply secured to the flat beds by any known means. It will readily be understood that nothing prevents any loose object from flying away from the carrier, especially if the car frame carrier drives at high speed.

There is therefore a serious need for a vehicle adapted to carry car frames without constituting danger to other vehicles and/or their occupants.

It is an object of the present invention to provide a device for carrying car frames or the like which is efficient, easy to use and remaining safe with respect to other vehicles and occupants therein.

SUMMARY OF INVENTION

In accordance with the present invention, there is provided a device for carrying car frames or the like, comprising a rectangular base member comprising at least one trailer bed, and means for mounting said base member on wheels. Transverse members are spacedly mounted on the base member and a first vertical protection wall is mounted at a front end of the base member. A second vertical protection wall is mounted on one longitudinal side of the base member, the other longitudinal side being free of vertical protection wall, and a third vertical protection wall is mounted at a rear end of the base member. Support means extend vertically from the transverse member and are aligned along a straight line spaced at an equal distance from the second protection wall. A non-slip member is disposed along the other longitudinal side of the base member, and means for securing a load of car frames are stacked on the transverse members between the support means and the non-slip members.

In accordance with a preferred embodiment, the base member comprises a front trailer bed and a rear trailer bed, the rear trailer bed being articulated to the front trailer bed, the first vertical protection wall being mounted at the front of the front trailer bed, the third vertical protection wall being mounted at the rear of the rear trailer bed, the second vertical protection wall being mounted on the longitudinal left sides of both front and rear trailer beds.

The support means may, for example, comprise a plurality of upstanding posts, which are each fixed to respective transverse members perpendicularly thereto.

In accordance with a preferred embodiment, the transverse members are parallel to one another and are equally spaced. Preferably, they comprise rectangular beam members.

The first, second and third protection walls may, for example, be made of network material, such as a steel grid.

In accordance with another preferred embodiment, the device may comprise a plurality of holding poles distributed along the periphery of the base member corresponding to the front and rear ends and the left longitudinal side, the holding poles being mounted to support the vertical protection walls.

In accordance with yet another preferred embodiment, there is one upstanding post for each transverse member, each post being unitary with a corresponding transverse member.

In accordance with still yet another preferred embodiment, the upstanding posts are spaced from the second vertical protection wall so as to generally provide a first space between the upstanding posts and the non-slip member which corresponds substantially to the width of a car frame, and a second space between the upstanding posts and the second vertical protection wall which is sufficiently wide to prevent damage to the second vertical protection wall by pieces of car frames possibly escaping from the load of car frames.

Preferably, the non-slip member comprises a triangularly shaped abutment fixed against the transverse members adjacent the other longitudinal side.

In accordance with yet another preferred embodiment, the securing means comprises a hooking rod fixedly mounted at the top of each upstanding post, a rail mounted underneath the base member to correspond to the other longitudinal side, a plurality of winches disposed in the rail, one winch being provided for each upstanding post, and chains, each attached at one end to a corresponding hooking rod and at the other end to a corresponding winch.

In accordance with another embodiment, solidifying means are secured at the bottom of the upstanding posts and onto respective transverse members to rigidify the upstanding posts relative to the transverse members.

In accordance with yet another embodiment, the device may also comprise securing plates at both ends of the transverse members, the securing plates extending past the lower face of the transverse members to engage the lateral left and right sides of the base member at the edges thereof.

In accordance with still another embodiment, first fastening means are provided to rigidly connect the upstanding posts to corresponding poles at the top thereof, and second fastening means are provided to rigidly connect the poles together at the top thereof.

BRIEF DESCRIPTION OF DRAWINGS

The invention is illustrated in the annexed drawings with reference to one embodiment, it being understood that the invention is not limited thereto. In the drawings:

FIG. 1 is a top plan view of an articulated trailer arrangement embodying a device according to the invention;

FIG. 2 is a side view of the articulated trailer illustrated in FIG. 1;

FIG. 3 is a transverse cross-section view through a loaded trailer showing the securing of the car frames thereon;

FIG. 4 shows the arrangement of a rear corner of a device according to the invention;

DESCRIPTION OF PREFERRED EMBODIMENT

Figure 7:
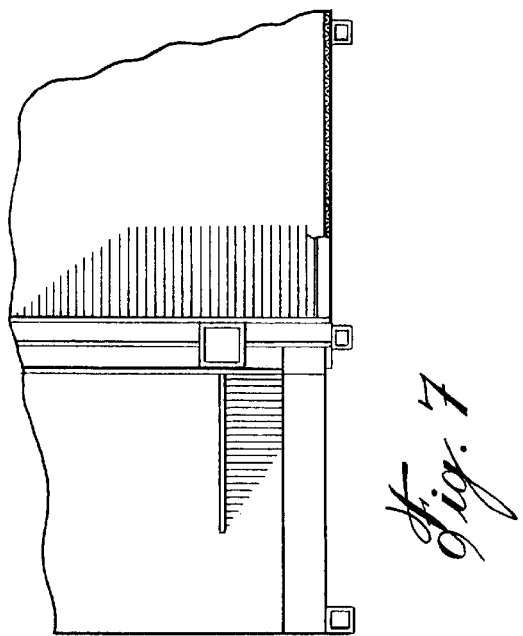
FIG. 7 is a cross-section view through line 7—7 of FIG. 3 showing the reinforcement of an upstanding post.
Figure 5:
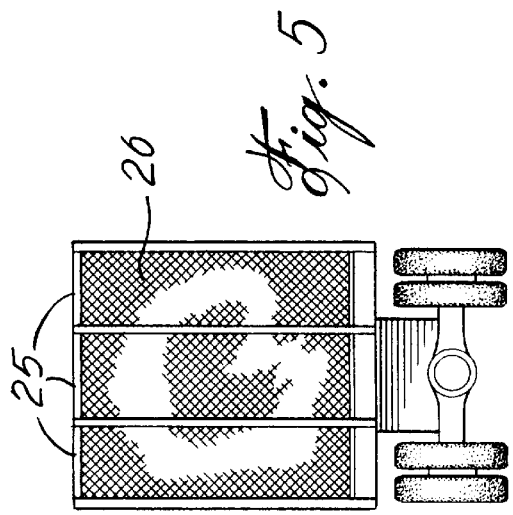
FIG. 5 shows the front of a trailer arrangement according to the invention.
Figure 6:
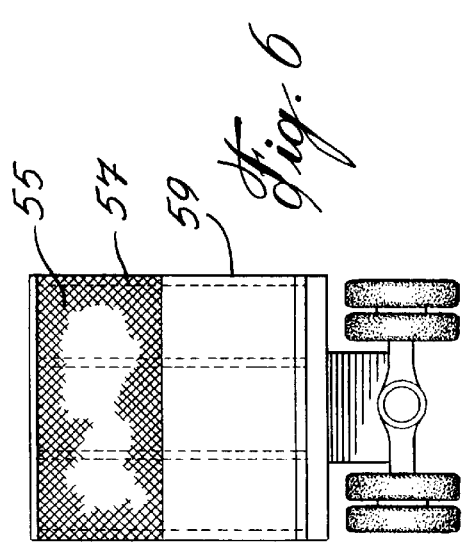
FIG. 6 shows the rear of the trailer arrangement.

With reference to the drawings, it will be seen that the illustrated device according to the invention comprises an articulated trailer 1. It is of course understood that the invention may also be applied to a single trailer, or to the back portion of a truck, in other words, to any carriage system which is adapted to be used to transport heavy material on motorways. In the embodiment which is illustrated, the articulated trailer 1 includes a front part 3 which is arranged to be attached to a tractor (not shown), and a rear part 5 which is attached in known manner to front part 3. Except for some minor details, for example the fact that the front of the trailer arrangement is in front part 3 and the rear of the trailer arrangement is in the rear part 5, both parts 3, 5 are generally similar. The differences will be described in detail later.

Although the trailer arrangement 1 according to the invention may be provided with one unit only, such as a tractor with a single trailer unit, the present description will be involved with an articulated trailer arrangement as illustrated in FIGS. 1 and 2, wherein front part 3 and rear part 5 are shown. It will be appreciated that the arrangement which has been illustrated is for use on highways where driving is on the right side. An equipment to be used on left driving highways would, of course, be modified accordingly, all within the spirit of the present invention.

Rear part 5 is articulated at 7 to front part 3, as shown. Referring more particularly to FIGS. 1 and 2, it will be seen that front part 3 comprises a bed 9 which is of standard construction for a trailer. Bed 9 is mounted in conventional manner over a frame 11 which is associated in known manner to a system of wheels 13. All along the left side of bed 9, there are provided a series of regularly spaced protection wall poles 14 and corner poles 15, 17, all of which have their lower parts fixed against the outer edge of the left side of bed 9 in a manner which will be fully described later. Similarly, at the front end of bed 9 additional regularly spaced protection wall poles 19 as well as corner pole 17, already mentioned, and also corner pole 21 are provided, and mounting of these poles 19 and 21 will be achieved in the same manner as for poles 15, 17 which will be fully described later. At the top, all the poles including the corner poles are held together by means of continuous angle iron 23 (FIG. 3) for poles 14, 15, 17 mounted along the left side of bed 9, and continuous angle iron 24 (FIG. 1) for poles 17, 19, 21 mounted at the front end of the articulated trailer. The angle irons are secured in known manner to the top of poles 14, 15, 17, 19 and 21. Finally steel grid protection walls 25 and 26 are applied in known manner respectively against poles 14, 15, 17, and poles 17, 19 and 21 interiorly thereof, as shown. It should also be noted that angle irons 23, 24 are fixed inside poles 14, 15, 17, 19, 21 for convenience.

Referring now more particularly to FIGS. 1, 2, 3 and 7, it will be seen that a number of transverse members 27 of specific construction, as will be described later, are fixed in known manner at regular space intervals against bed 9. More particularly, each transverse member 27 is a square steel beam 4"×4"×5/16" wherein both ends are terminated by steel plates 29 31. Of course, any other suitable construction for transverse members 27 may be used as long as they serve the purpose. Steel plate 29 is provided at the end of the beam coinciding with the right side of the bed, while steel plate 31 is provided at the opposite end of the beam coinciding with the left side of bed 9. In addition, short of the end of the beam corresponding to the left side of bed 9, the beam is provided with an upstanding support post 33 mounted perpendicularly thereto as shown. The support post may be integral with the transverse beam or may be fixed thereto in any known manner. In the embodiment which has been illustrated, support post 33 is integral with transverse beam 27. In order to rigidify the support post, there are provided steel plates 35 and 37 respectively. Steel plate 35 is L-shaped and has its base fixed in known manner to the top face of transverse beam 27 on the side of the support post which faces load 39 of car frames. Steel plate 37 on the other hand is triangular and is disposed between support post 33 and steel grid 25, all as shown particularly in FIG. 3, and is fixed to both post 33 and transverse member 27 in known manner. Finally, to make sure that the support post is sufficiently rigid, T-shaped members 41 are used to connect both transverse beam member 27 and support post 33. The T-shaped member is fixed in known manner such as by soldering or screwing to both transverse beam member 27 and support post 33 on both sides thereof, as shown. After mounting the transverse beam members 27 including upstanding post 33 on bed 9, with steel plates 29, 31 engaged over the outer edges of bed 9, plates 35, 37 and T-shaped member 41 are fixed thereto as indicated above. The top ends of support posts 33 and of a corresponding pole 14 are connected together by means of braces 43 while poles 14, 15, 17, 19, 21 are connected together respectively by means of angle irons 23, 24. In order to reinforce the base of steel grid 25, an angle iron 45 is disposed between bed 9 and steel grid 25, the latter being fixed in known manner to angle iron 45 (FIG. 3). A similar angle iron 45 is disposed betweeen each pole 13, 15, and 17.

Finally, in order to prevent a stack of car frames 39 from falling off the trailer and to be firmly secured thereto, first there is provided a triangular non-slip member 46 at the outer ends of each transverse beam 27 as shown. Second, chain 47 is provided which has one free end engaged into hooking rod 49, and the other end engaged into winch 51, which is mounted into rail 53.

It will therefore be seen that the front part of articulated trailer 1 has a left side and a front end which are provided with respective steel grids 25 and 26.

Turning now to rear part 5 of the articulated trailer 1, it will be realized that it is similar to the front part, except that instead of having a front end provided with steel grid 26, in this case the corresponding steel grid 55 is mounted at the rear end of the rear part and consequently of the articulated trailer. However, in this case it has been found preferable to construct steel grid 55 in two parts, a grid part 57 at the top and a solid steel part 59 at the bottom. All in all, both left sides of the articulated trailer have a similar steel grid 25, front part 3 has its front end provided with steel grid 26, while rear part 5 has its rear end provided with steel grid 55 with grid part 57 and steel part 59. The rear end of front part 3 and the front end of rear part 5 are unobstructed, i.e., they are free of steel grids.

Loading and unloading of car frames onto the articulated trailer according to the invention is carried out preferably with a fork loader through the right side.

Although the invention has been illustrated with respect to a preferred embodiment, it is understood that modifications are possible all within the scope and spirit of the invention as defined in the appended claims.

We claim:

1. Device for carrying cargo, which comprises
a rectangular base member comprising at least one trailer bed, and means for mounting said base member on wheels,
transverse members spacedly mounted on said base member,
a first vertical protection wall mounted at a front end of said base member,
a second vertical protection wall mounted on one longitudinal side of said base member, the other longitudinal side being free of vertical protection wall,
a third vertical protection wall mounted at a rear end of said base member,
support means extending vertically from each said transverse member and aligned along a straight line spaced at an equal distance from said second protection wall,
a non-slip member disposed along the other longitudinal side of said base member, and
means for securing a load of cargo stacked on said transverse members between said support means and said non-slip member.

2. Device according to claim 1, wherein said base member comprises a front trailer bed and a rear trailer bed, said rear trailer bed being articulated to said front trailer bed, said first vertical protection wall being mounted at the front of said front trailer bed, said third vertical protection wall being mounted at the rear of said rear trailer bed, said second vertical protection wall being mounted on longitudinal left sides of both said front and said rear trailer beds.

3. Device according to claim 1, wherein said support means comprise a plurality of upstanding posts, each post fixed to a respective one of the transverse members perpendicularly thereto.

4. Device according to claim 1, wherein said transverse members are parallel to one another and are equally spaced.

5. Device according to claim 4, wherein said transverse members comprise rectangular beam members.

6. Device according to claim 1, wherein said first, second and third protection walls are made of network material.

7. Device according to claim 6, wherein said network material consists of a steel grid.

8. Device according to claim 1, which comprises a plurality of holding poles distributed along the periphery of said base member corresponding to said front and rear ends and said one longitudinal side, said holding poles mounted to support said vertical protection walls.

9. Device according to claim 3, which comprises one said upstanding post for each transverse member, each post being unitary with a corresponding transverse member.

10. Device according to claim 9, wherein said upstanding posts are spaced from said second vertical protection wall so as to generally provide a first space between said upstanding posts and said non-slip member which corresponds substantially to the width of a cargo, and a second space between said upstanding posts and said second vertical protection wall which is sufficiently wide to prevent damage to said second vertical protection wall by pieces of cargo possibly escaping from a load of said cargo.

11. Device according to claim 1, wherein said non-slip member comprises a triangularly shaped abutment fixed against said transverse members adjacent said other longitudinal side.

12. Device according to claim 1, wherein said securing means comprises a hooking rod fixedly mounted at the top of respective upstanding posts of said support means, a rail mounted underneath said base member to correspond to said other longitudinal side, a plurality of winches disposed in said rail, one winch being provided for each said upstanding post, and chains, each attached at one end to a corresponding hooking rod and at the other end to a corresponding winch.

13. Device according to claim 9, which comprises solidifying means secured at the bottom of said upstanding posts and onto respective transverse members to rigidify said upstanding posts relative to said transverse members.

14. Device according to claim 13, which comprises securing plates at both ends of said transverse members, said securing plates extending past a respective lower face of said transverse members to engage lateral left and right sides of said base member at edges thereof.

15. Device according to claim 10, which comprises first fastening means to rigidly connect said upstanding posts to corresponding poles at the top thereof, and second fastening means to rigidly connect said poles together at the top thereof.

16. Device according to claim 13, wherein said solidifying means comprise a first connecting plate and a second connecting plate, said connecting plates being fixed to respective upstanding posts and transverse members on two opposite sides of said upstanding posts, and T-shaped members fixed to said upstanding posts and said transverse members on remaining sides of said upstanding posts.

* * * * *